Patented Mar. 2, 1948

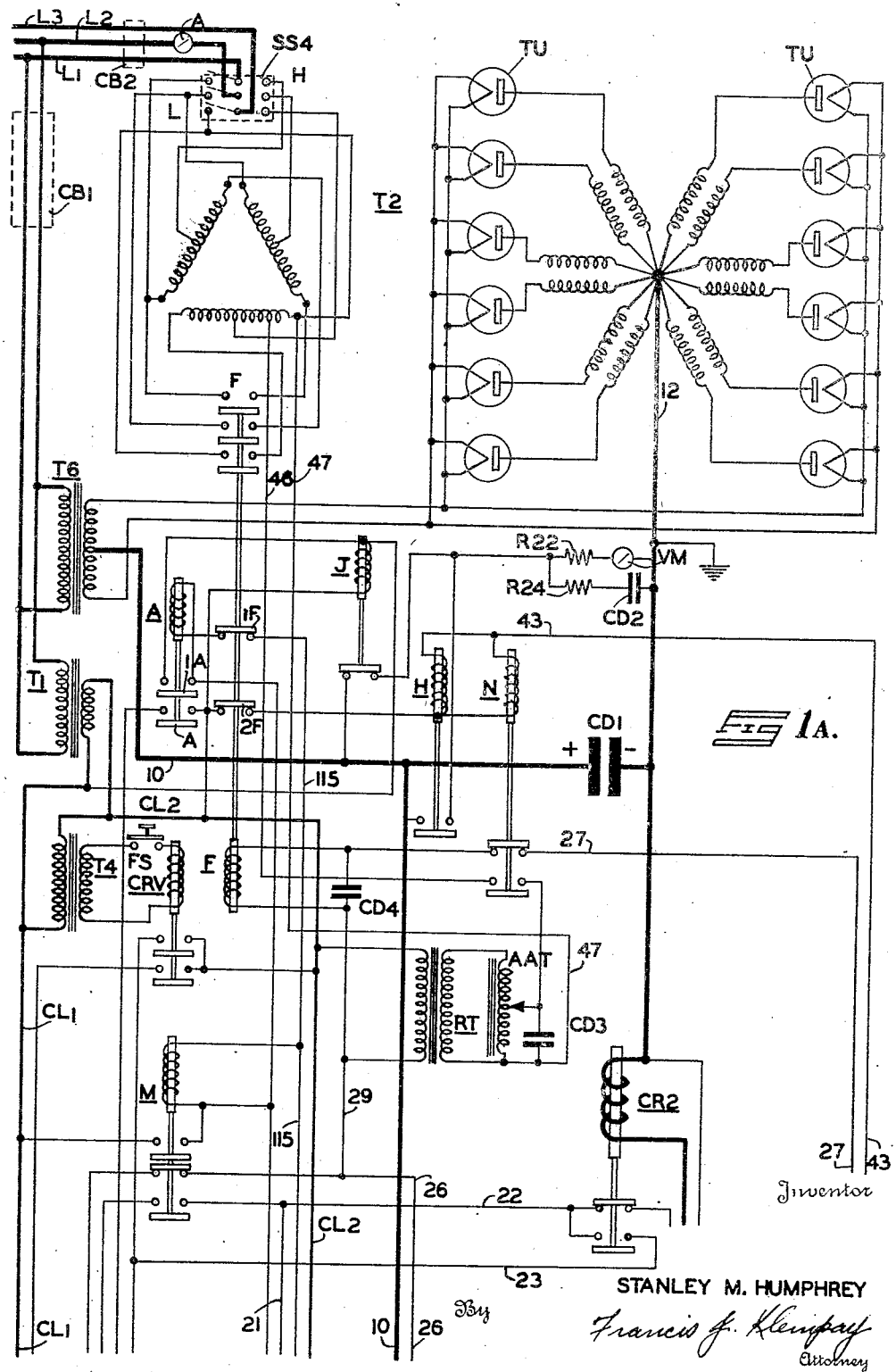

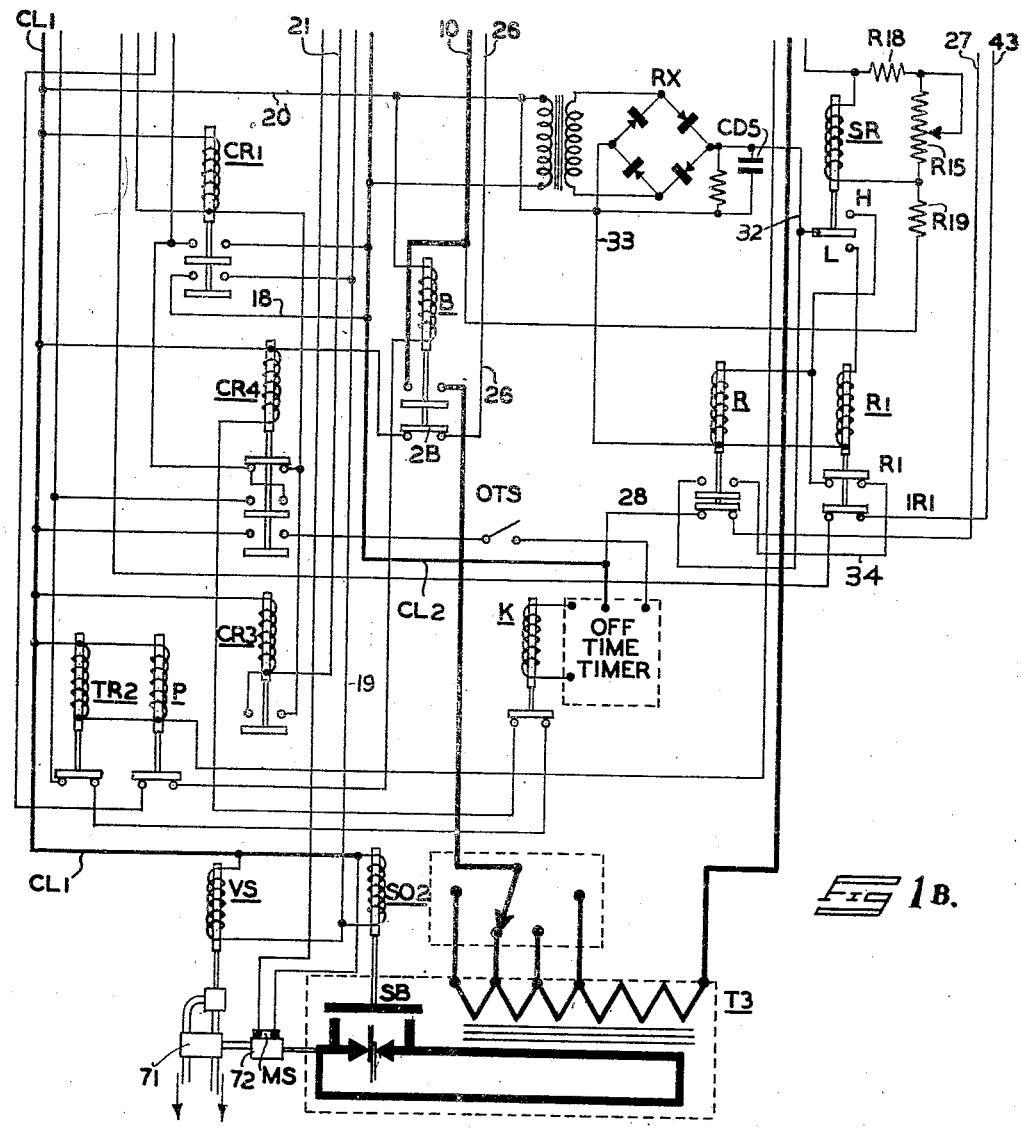
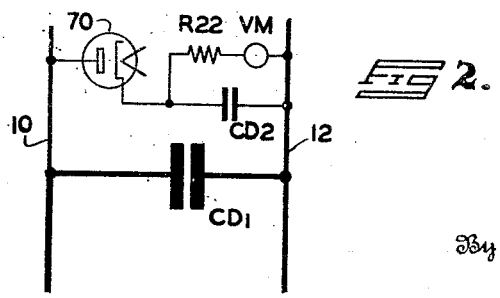

2,436,863

UNITED STATES PATENT OFFICE 2,436,863

WELDING APPARATUS

Stanley M. Humphrey, Warren, Ohio, assignor to Taylor-Winfield Corporation, Warren, Ohio, a corporation of Ohio Application February 15, 1941, Serial No. 379,084

14 Claims. (Cl. 219—4)

This invention relates to apparatus for electric welding and more particularly to such apparatus utilizing a capacitor or capacitors to supply the surges of welding current. To this end the apparatus includes a capacitor unit of substantial size, a rectifying circuit for expeditiously charging the unit from alternating current power sources, a discharge circuit for conveying the energy from the capacitors to the work to effect the welding thereof, and various ancillary circuits and devices which are required in a practical embodiment of the apparatus. The invention includes improvements in the charging, discharging, and control circuits—involving also improved features of construction of various appliances utilized therein—as well as improvements in the mechanical elements of the apparatus and in the correlation of the operation of the electrical and mechanical parts of the system.

The apparatus involved herein is particularly useful in welding heat treated aluminum alloys but it should become apparent, as the exposition of the principles thereof progresses, that it is also adaptable to welding other metals, such as the various types of bronze, as well as steel in the lighter gauges. Regardless of the material, the welds may be effected with a minimum depression on either side of the stock.

The primary object of the invention is the provision of an apparatus which may be embodied in a commercially satisfactory form for the production welding of aluminum alloys and other metals by the capacitor discharge method. This involves an accurate and dependable automatic control of various factors involved in the operation of the system so that once the system is set up for a particular welding operation, successive good welds may be accomplished at a high rate and in a dependable manner over long periods of time.

To accomplish the above without requiring special and costly power installations a highly efficient and economical capacitor charging circuit is provided which is automatically operative to begin the recharging of the capacitor at the maximum practicable rate immediately upon the completion of a preceding welding cycle. Another object of the invention is the attaining of the above by means of economical, rugged and dependable equipment to the end that the system may be commercially practicable.

Further objects of the invention are the provision of simple and dependable arrangements for governing the peak voltage impressed on the capacitor or capacitors, for selecting the total capacity thereof, for accurately maintaining the voltage to which the capacitor is charged regardless of variations in the time interval between successive welds, and for indicating instantaneously the voltage attained by the capacitor. In practice these features are important since the quality and uniformity of the welds are dependent on the uniform application of predetermined voltage and total energy.

Another object of the invention is the provision, in a welding machine of the capacitor discharge type, of an improved discharged circuit for transferring the energy in the capacitor to the welding load. Normally, the welding load circuit is inductive, including, for example, a welding transformer, and this inductive circuit together with the capacitor constitutes an oscillatory circuit. To avoid the recharging of the capacitor and to insure the uni-directional discharge of the capacitor through the welding load it is essential that some means be provided to shunt the flow of current around the capacitor upon the reversal of voltage in the inductive part of the welding load circuit. This mode of operation is accomplished, in accordance with the preferred embodiment of the invention by so constructing the transformer employed to charge the capacitor in such manner that the secondary winding thereof provides a low impedance path which may be utilized in the shunt circuit mentioned above. Connected in series with the secondary winding and the capacitor is a suitable rectifier and this rectifier together with the low impedance secondary circuit constitutes a uni-directional low impedance shunt circuit to absorb the flow of current from the inductive load upon voltage reversal in the load. Thus the single rectifier may be made to serve both as a charging rectifier and means providing the above mentioned uni-directional shunt path.

In order to keep the total impedance of the shunt circuit low the current limiting device ordinarily employed in the output circuit of the rectifier is eliminated and to provide for the limiting of the charging current the charging transformer is so constructed as to possess high leakage reactance between its primary and secondary windings. In order that rectifiers of practicable current carrying capacity may be employed it is desirable to distribute the load during charging, but more partcicularly during conduction of the heavy shunt current, among a multiplicity of rectifier devices. In order to distribute the load effectually the charging transformer secondary may be wound as a six-phase star-connected unit. To further distribute the load the winding in each phase may consist of a pair of mutually inductive conductors to each of which is connected a rectifying device.

A still further object of the invention is the provision of an improved welding system of the capacitor discharge type in which a transformer, with its attendant advantages, may be utilized to transfer the energy stored in the capacitor to the work. As indicated above, it is highly desirable that the discharge from the capacitor be unidirectional and it will be understood that successive applications of these heavy direct current surges in the same direction to the primary winding of the transformer would very quickly result in almost total magnetic saturation of the transformer core thus seriously reducing the efficiency of the transformer. This condition is avoided by discharging the capacitor through the primary of the welding transformer in alternate directions in succeeding welding cycles. This may be accomplished, for example, by employing double pole contactors controlled by a pilot reversing switch although certain advantages may be attained by providing a primary winding with a center tap and utilizing the winding on alternate sides of the tap in successive operations. The latter arrangement permits a permanent ground to be connected to the primary winding and to the capacitor and simplifies the equipment since single-pole contactors may be used as will be understood.

The above subject matter involving the reversing of the current flow through the primary winding of the welding transformer is more fully disclosed and claimed in my copending application Serial No. 469,805, filed December 22, 1942, which is a continuation of the present application.

Yet another object of the invention involves the increasing of the rate of production of a capacitor discharge type of welder while decreasing the rate of deterioration of the work engaging electrodes thereof. Maximum efficiency is attained when the current flow is unidirectional and in practice the discharge circuit is so designed that the wave form of the discharge has a front identical with the first quarter cycle of an oscillatory discharge, then decaying exponentially to zero. A considerable time interval may elapse before the discharge reaches zero and the later low current at the end of the weld does not aid in effecting the weld. In accordance with the present invention, the welding transformer is shorted when the discharge current recedes below an effectual value. The electrodes may then be opened immediately without flashing and a considerable time interval is thus saved in each welding cycle. Also the electrodes are protected from pitting at the time they open, and work surfaces are protected in a similar manner.

Other objects and advantages of the invention will become apparent from a consideration of the following detailed specification and the accompanying drawing wherein there is specifically disclosed a preferred embodiment of the invention.

In the drawing:

Figure 1, consisting of parts IA and IB, is a wiring diagram of a welding system constructed in accordance with the principles of the present invention; and Figure 2 is a fragmentary diagram of a modification of the system of Figure 1.

The apparatus in its preferred and illustrated embodiment includes a charging transformer system T2, a trasnformer T1 for supplying control current, a transformer T6 for supplying rectifier tube filament current, a capacitor bank comprising the capacitors CDI, and a welding transformer T3. In practice the secondary of the welding transformer may be connected to the operative work engaging electrodes of a welding machine in which one of the electrodes is normally fixed and the other of the electrodes is moved towards and away from the fixed electrode by a fluid pressure motor through an air lock comprising collapsible linkage all as fully disclosed in my copending application for United States Letters Patent Serial No. 306,127, now Patent No. 2,293,393, to which reference is hereby made for the purpose of more fully explaining certain of the operating aspects of the present apparatus.

Through instrumentalities to be hereinafter fully disclosed, the power capacitor discharge through the welding transformer is initiated by actuation of a micro-switch schematically shown at MS which in practice may be mounted on the air lock 72 in such manner that it can only be actuated during collapsing of the lock—i. e. after the movable electrode has engaged the work and while the substantially uniform pressure in the lock is maintaining a constant predetermined welding pressure. The valve solenoid designated by reference VS herein, when energized in sequence upon actuation of the foot switch FS in a manner to be hereinafter explained, is operative to divert fluid under pressure to one side of the motor to move the electrodes together and to apply the welding pressure thereto and when de-energized, the valve, being spring biased, will divert fluid pressure to the opposite side of the motor to move the electrodes apart.

Electrical power is supplied to the system through a three phase power line having conductors L1, L2, and L3 which line branches into two circuits, one a single phase circuit through breaker CB1 for supplying control energy and current for the filaments of the rectifying tubes, and the other a three phase circuit through circuit breaker CB2 for supplying the welding energy through transformer T2. Interposed between CB2 and the capacitor charging transformer T2 is a manually operated switch SS4 to lower the transformer secondary voltage for very low values of capacitor voltage or when charging very small values of the capacitor. The flow of energy to the charging transformer is controlled by solenoid F through its operated and normally open contacts F which are in the phases of the transformer primary rather than in the lines. This results in a minimum load on the contacts since the phase current is substantially less than the line current. When contacts F are open the transformer secondary is deenergized but one side of each primary is still connected to the line and remains so until the circuit breaker CB2 is opened. Transformer T2 contains sufficient leakage reactance to limit the charging current. In practice the transformer T2 is wound and tapped so that the primaries may be connected for different commercial voltages in the power line.

The secondaries of the charging transformer T2 are wound with parallel wires in such a way that a six phase star connection is obtained which will permit the use of twelve rectifier tubes TU, the parallel conductors in each phase being each connected to an anode of one of the tubes. The mutual inductance in the parallel windings forces uniform distribution of current to the two tubes in each phase and enables tubes of smaller capacity to be utilized.

The secondary winding of transformer T6 is provided with a center tap and the output of the rectifying system is conveyed to the capacitor CD1 through said center tap, conductor 10, the ground connection 12 completing the circuit. Also connected across the output of the rectifier and across the power capacitor CD1 is a resistance R19 and sensitive contact making relay SR with a shunt around it made up of resistor R18 and variable resistor R15. By proper adjustment of the variable resistor relay SR may be made to close at any predetermined voltage appearing across the capacitor. The contacts of SR act to cut off the charging current in a manner which will be described in detail in the description of the sequencing circuit.

A second network is connected across the power capacitor CD1 consisting of voltmeter VM, voltmeter multiplier R22, capacitor CD2, resistor R24, normally open contact H, and normally closed contact J. The purpose of the voltmeter is to indicate the voltage on the capacitor. The normally open contact H operates in conjunction with the sequence control to be hereinafter described in such manner that it will open just before the capacitor is to be discharged, and is closed just after it has been recharged. During the period that contact H is opened the capacitor CD2 maintains voltage on the voltmeter, in this way mechanical oscillation of the voltmeter is avoided. The purpose of the contact J is to keep the voltmeter connected across the capacitor even though both circuit breakers CB1 and CB2 may be open.

In the illustrated embodiment of the invention, the capacitor CD1 is arranged to be discharged through the primary winding of the welding transformer by means of a contactor arranged to be operated by the relay coil B. Various arrangements for effecting the reversal of current flow through the welding transformer in succeeding welding operations is disclosed and claimed in said copending application Serial No. 469,805. In each of the discharge circuit arrangements a relay coil CR2 is placed in series with one of the main leads interconnecting the capacitor and the primary winding of the welding transformer. This relay pulls in with the welding current and will drop out when the welding current approaches zero. Its purpose will be described in detail as a part of the sequence control.

When the capacitor CD1 is discharged the discharge circuit will or will not oscillate, depending on the discharge circuit constants. If the constants are such that oscillations would normally tend to occur they will be prevented from occurring and excess inverse voltage will be prevented from appearing across the capacitor by virtue of the fact that a low impedance path consisting of the six secondary legs of the charging transformer is automatically connected in parallel across the capacitor through the rectifiers TU previously used for charging the capacitor. These rectifiers will cause this impedance to become connected at the proper time, which is just after the voltage across the capacitor passes through zero, since at this point the diodes are connected in the proper polarity to start conducting. Furthermore since the six secondary windings are in pairs, each pair being wound on a separate iron core in such a physical manner that the leakage reactance between them is low and since the direct currents flowing through the diodes each proceed toward the common point or center tap of the windings the resultant total impedance will be very low. If desired, auxiliary contacts, not shown, on relay A may be employed to close across the charging transformer secondaries to eliminate the necessity of designing and constructing the charging transformer with low leakage reactance between the two halves of the secondaries.

It should be observed that during discharge of the principal capacitor CD1 the rectifier, being shunted across the capacitor, provides a low impedance unidirectional current path in shunt with the capacitor to take the surge of current resulting from the inductive reactance of the welding transformer primary thereby preventing or limiting the recharging of the principal capacitor and preventing oscillation in the discharge circuit. This subject matter is disclosed and more broadly claimed in said copending application Serial No. 469,805, which application also illustrates and claims the more specific embodiment involving the shorting out of the charging transformer secondary winding during the discharging of the principal capacitor.

*Sequence control*

Power for control purposes and for maintaining a predetermined voltage on the power capacitor bank once the latter has been charged through the principal charging transformer T2 is derived from the secondary of transformer T1 and conveyed through the conductors CL1 and CL2. Connected across the control power line is a transformer T4, the low voltage secondary of which is in series with foot switch FS and a coil CRV whose mechanically connected contact through normally closed switch on relay CR4 energizes coil CR1 which seals in through a normally open contact on relay CR1.

Switch CR1 through conductors 18 and 19 energizes the valve solenoid VS from the control power line and as explained above this action moves the movable electrode towards the fixed electrode of the welding machine. In series with switch CR1 is a normally closed contact 1F, a relay coil A, and the above mentioned microswitch MS. As the air lock collapses MS is closed and coil A is sealed in through normally open switch 1A. Closing of switch A energizes relay B through conductor 20, and normally closed contact on relay P. Closing of the contactor B in the welding power line initiates flow of the welding current which current pulls in relay CR2 interposed in the discharge circuit.

Normally open contact on relay CR2 then energizes relay CR3 through conductors 21, 22 and 23 which seals itself in through holding contacts. As the welding current dies out coil CR2 allows its normally open contact to open and its normally closed contact to close thereby energizing relay TR2 through previously closed contact CR3. TR2 is a time delay relay and when the same is timed out it closes its normally open contacts which through normally closed switch K energizes coil CR4. The latter through its normally closed contact releases coil CR1 thereby de-energizing the valve solenoid and causing the movable electrode to lift.

If the machine is set for repeat action by closing switch OTS the energizing of coil CR4 also through a normally open contact on relay CR4 initiates the off time timer, and after the off time timer OT has timed out its period normally closed contact K opens, releasing coil CR4 which by closing its normally closed contact re-energizes CR1, thereby repeating the cycle of operation.

Energization of relay F energizes transformer T2 and initiates the charging operation. When the voltage on the capacitor CD1 has reached a predetermined value the H contact on relay SR closes and through lines 32 and 33 leading from a rectifier RX powered through lines CL1 and CL2, relay R is energized. This opens the normally closed contact in line 21 thereby de-energizing coil F and interrupting the charging operation. At this time relay R is sealed in through line 34. The capacitor is now charged ready for welding. It should be observed, however, that the normally closed contact IF is in series with relay A to prevent the closing of the power contactor B unless the capacitor is fully charged.

When power contactor B is closed to make the weld, the normally closed contacts 2B in line 26 are opened; the decaying voltage on the capacitor causes the L contact on SR to close, which energizes coil RI thereby opening normally closed contact RI in line 34 thereby de-energizing coil R thereby closing the normally closed contact on relay R in line 28 to coil F. F doesn't operate however, since normally closed contact 2B in line 26 is open. When the weld has been completed the reclosing of normally closed contact on relay CR2 energizes relay P which releases contactor B. The contacts 2B in line 26 then close which re-energizes coil F initiating the recharge. The charge is then cut off in the same manner as previously described.

*Capacitor voltage stabilization*

To insure uniformity and quality of the successive welds it is essential that the predetermined charge be maintained on the power capacitor to the time the same is discharged through the welding transformer and in accordance with the preferred embodiment of the invention this is accomplished in a dependable manner by the following arrangement. Deriving energy from the control current line through normally closed switch 2B and conductors 29 and 26 is a regulating transformer RT the output of which is fed into an auto transformer AAT capable of fine adjustment. The output of AAT is connected to one of the coils of the center leg of the charging transformer T2 through a contact on relay N and conductors 46 and 47, which contact is normally open, being closed by energization of coil N which is connected in parallel with coil H which is normally energized upon completion of a welding cycle and the subsequent recharging of the capacitor CDI. Therefore whenever the capacitor is fully charged and the machine is standing idle coil N will be energized and AAT will be feeding voltage to the charging transformer and through the rectifier to the capacitor. The voltage output of AAT is then adjusted so that the peak voltage on the secondary of the charging transformer is equal to the voltage to which the capacitor is charged and therefore as the voltage tends to decrease on the capacitor, due to inherent leakage or leakage through the voltmeter this circuit makes up for this leakage and maintains the proper voltage on the capacitor. When the power contactor B is closed, or relay RI is energized, or contactors F are closed, or contactor M is open, this makeup current supplying circuit is disconnected by means of contact N. Capacitor CD3 is provided to draw a leading current approximately equal to the magnetizing current of the charging transformer so that the load of the regulating and auto transformers is substantially reduced.

To prevent the voltmeter needle from swinging when charging and discharging a relay H is provided whose operation is as follows—starting with the electrodes in spaced position and the capacitor CDI charged, coil H is energized through normally closed contacts 2B, normally closed contacts on relay M, contacts IRI and 2F and therefore the voltmeter is connected across the capacitor. Closing the switch MS energizes coil M and normally closed contact on relay M is opened, thereby de-energizing H. As the sequence progresses power contactor B is next opened, then relay RI is opened. As the weld current dies out and the sequence system operates, normally closed contact on relay M is reclosed and contacts 2B are closed but contact RI is still open since there is no voltage on the capacitor to open the low contact of relay SR. On the reclosing of normally closed contacts 2B however relay F becomes energized since the normally open contact on relay R is now closed. The energizing of F causes the recharge to take place and as the charge progresses the L contact on SR is opened thereby causing IRI in line 43 to close. As the charge is completed relay F finally opens and the closing of contact 2F in line 43 finally re-energizes coil H and reconnects the voltmeter back across the capacitor CDI. Normally closed contact IF is placed in line 115 in order that coil A cannot be energized unless coil F is de-energized in the normal sequence of operation, thus preventing initiating the weld until the capacitor is fully charged.

Capacitor CD4 is connected across coil F to speed up the opening of relay F by increasing the rupture on the contact of relay R.

To protect the welding electrodes at their opening and to decrease the time required to effect a complete welding cycle, a solenoid SO2 is in parallel with the valve solenoid so that unless the latter is energized to move the movable head of the welding machine towards the fixed electrode or to apply welding pressure, a spring loaded bar SB mechanically connected to the armature of SO2 provides a short across the secondary of the welding transformer.

It should now be apparent that I have provided an improved electric welding apparatus which accomplishes the objects initially set out. By means of the novel instrumentalities and the novel applications of other devices as explained above it is possible to construct a practicable and rugged welding apparatus which is capable of effecting high quality welds in aluminum alloys, bronzes, light gauge steels and other metals in a uniform and productive manner over long periods of time without excessive attention to and maintenance of the equipment involved. For example, the improvements in the capacitor charging circuit and particularly in the construction and arrangement of the transformer therein enables rectifier tubes of smaller capacity to be utilized and the rectifier tubes themselves may also serve to prevent oscillation in the capacitor discharging circuit. This enables the apparatus to be substantially simplified in design and construction and further enables a reduction in initial and maintenance cost of the apparatus to be effected. By constructing the transformer with high primary to secondary leakage reactance the total maximum output of the rectifier is limited to protect the equipment when the power capacitors are discharged and recharging commences and the peak current required to be handled by each of the rectifier tubes or pairs of such tubes is further substantially reduced since conduction may be simultaneously spread over a majority of the tubes with the peak current rotating in synchronism with the secondary phases. An appreciable flow is simultaneously attained in the tubes of the leading and lagging phases—decreasing in magnitude in proportion to their off phase deviation with respect to the in phase tube or tubes. Further the use of the parallel windings in the secondary which assures equalization between the two tubes in each phase further reduces the required capacity of the individual tubes.

An important feature of the invention having substantial practical merit is the maintaining of the voltage on the voltmeter VM while the power capacitors are being charged and discharged. This prevents the indicator of the meter from oscillating and enables the welding machine operator to ascertain at any time and at a glance the peak voltage being delivered to the work at hand. In the specifically disclosed embodiment contact H disconnects the voltmeter from the main capacitor bank at the start of the discharge, and then reconnects it at the completion of the recharge, the auxiliary capacitor CD2 maintaining the voltage on the meter during this interval. It is contemplated that in place of the contact H a rectifying tube may be substituted to prevent discharging of the auxiliary capacitor during the discharging of the main capacitor bank thus also preventing violent fluctuation of the voltmeter indicator. This arrangement is shown in Figure 2, the reference numeral 70 designating the rectifier. Slight reversals of the voltage in the main capacitor will not affect the reading on the meter since the value of the inverse voltage will not reach the voltage on the auxiliary condenser.

An accurate and dependable control of those factors which result in uniform and quality welds is maintained at all times by the use of economical and rugged devices. The efficiency of the discharge circuit is maintained uniformly high by eliminating any possibility of saturation in the core of the welding transformer. The desired capacitor voltage is maintained for varying off periods without the use of complicated tube types or other complicated or delicate apparatus.

An important feature in obtaining successful operation of stored energy welding equipment is the elimination of sparking at the electrodes whereby the work and electrodes are protected against pitting and rapid deterioration. This is accomplished in accordance with the preferred embodiment of the invention by employing the shorting bar SB operable in the manner described above. In addition to the shorting bar a capacitor may be connected directly across the tips of the welding electrodes to further eliminate any possibility of sparking. The leads from the capacitor are connected within two or three inches of the ends or tips of the electrodes and may extend along the upper and lower horns of the machine to avoid any mechanical interference. If desired, a sufficiently large capacitor may be used which will eliminate the necessity of the shorting bar entirely.

The above specifically described embodiment of the invention should be considered as illustrative only as obviously many changes may be made therein without departing from the spirit or scope of the invention. For example, reversal of current flow in the primary of the welding transformer may be accomplished by providing a winding with a center tap and utilizing single pole contactors as explained above.

Also other circuits than those specifically described may be employed to stabilize the voltage on the welding power capacitors since the whole function of the stabilization feature is to bring the voltage of the capacitors to a predetermined value and to maintain the voltage at such value. In this connection it should be understood that the peak voltage of the current emitted by the principal charging rectifier (TU) is substantially higher than the voltage desired to be impressed on the capacitors to insure a high rate of charging and that relay SR may be subject to some error in its response. Regardless of the true value of the capacitor voltage upon interruption of the principal charging source if the value is near or above the peak voltage of the secondary charging source, the latter will operate to correct the deviation either upwardly or downwardly and will thereafter maintain the correct voltage. Obviously the secondary charging (or stabilization) current source may be supplied, if desired, entirely independently of the principal charging equipment including transformer T2. It is only necessary that the peak voltage of the secondary charging current applied be maintained constant and equal to the voltage desired to be reached and maintained at the capacitors.

While the specifically described and illustrated embodiment of the invention employs polyphase capacitor charging equipment it should be apparent that substantially all of the features of the invention are equally applicable when using single phase current and equipment. Reference should therefore be had to the appended claims in determining the scope of the invention.

What I claim is:

1. A welding system comprising a capacitor, a welding circuit adapted to be energized by said capacitor comprising a pair of welding electrodes, means to discharge said capacitor through said circuit, means to move said electrodes apart upon completion of a welding cycle, and means to short said electrodes upon actuation of said means to move said electrodes apart.

2. A welding system comprising a capacitor, a welding circuit adapted to be energized by said capacitor comprising a welding transformer and welding electrodes connected with the secondary thereof, means to move said electrodes apart upon completion of a welding cycle, and means to short out said transformer upon actuation of said means to move said electrodes apart.

3. A welding system comprising a capacitor, a welding circuit adapted to be energized by said capacitor and including a pair of welding electrodes, means to discharge said capacitor through said circuit, and means responsive to the decay of the current flow in said circuit to short out said electrodes.

4. Welding apparatus comprising in combination, an alternating current source, an electrical energy storing device, means to charge said device comprising a transformer having its primary connected to said source and its secondary connected to a rectifier, means responsive to the voltage impressed on said device to interrupt said current source upon said device attaining a predetermined voltage, a second alternating current source, means to maintain constant a preselected peak voltage in said second source, and means to connect said second source to said transformer upon actuation of said means to interrupt.

5. Welding apparatus comprising in combination, an alternating current source, an electrical energy storing device, means to charge said device comprising a transformer having its primary connected to said source and its secondary connected to a rectifier, means responsive to the voltage impressed on said device to interrupt said current source upon said device attaining a predetermined voltage, and means to impress a constant preselected peak voltage on at least a portion of said primary whereby the voltage on said device may be maintained constant.

6. Welding apparatus comprising in combination a capacitor for storing welding energy, an alternating current source, means to charge said capacitor from said source comprising a transformer having high primary to secondary leakage reactance and a low impedance secondary connected to said capacitor through a rectifier, means to interrupt said current source upon said capacitor reaching a predetermined voltage, and means to maintain said voltage on said capacitor comprising an auxiliary source of alternating potential having a predetermined constant peak voltage, and means to maintain said potential on at least a portion of the primary of said transformer whereby the charge on said capacitor may be maintained constant.

7. Welding apparatus comprising in combination, a capacitor for storing welding energy, an alternating current source, means to charge said capacitor from said source comprising a high primary to secondary leakage reactance transformer having a polyphase primary connected to said source and a polyphase secondary connected to a rectifier, said rectifier comprising a space discharge device connected in each of the phases of said secondary, the cathodes of said discharge device being connected to said capacitor, the circuit constants being such that simultaneous conduction is effected in a plurality of said discharge devices.

8. In welding apparatus of the capacitor discharge type having a capacitor for storing welding energy, the combination of a load circuit arranged to be energized by said capacitor, said circuit including the primary winding of a welding transformer, means providing a unidirectional current path across said winding and capacitor, welding electrodes connected to the secondary of said transformer, and means to short said transformer upon the decay beyond a predetermined value of the current in said circuit resulting from the discharge of said capacitor.

9. Welding apparatus comprising in combination a capacitor for storing welding energy, a circuit for discharging said capacitor through the welding load, a voltmeter connected across said capacitor to indicate the voltage to which the capacitor is charged, and means to maintain the voltage on said voltmeter during discharge of said capacitor whereby oscillation of the voltmeter indicator is prevented during operation of the apparatus comprising a condenser in parallel with said voltmeter, and means to disconnect said voltmeter and condenser from across said capacitor during discharge of the latter.

10. Welding apparatus comprising in combination, an electrical energy storing device, means to charge said device comprising a principal source of fluctuating unidirectional current having a peak voltage substantially higher than the voltage to be impressed on said device whereby a high rate of charging may be achieved, means to interrupt said principal source, and a second source of fluctuating unidirectional current adapted to be connected to said device, the peak voltage of said second source being substantially equal to the voltage desired to be maintained on said device whereby the voltage impressed on said device by said principal source is corrected and maintained.

11. Welding apparatus comprising a capacitor for storing welding energy, an inductive welding load circuit, means to charge said capacitor comprising a transformer having high primary to secondary leakage reactance and a low impedance secondary consisting of adjacent mutually inductive parallel conductors, and a rectifier interconnecting each of said conductors and said capacitor both during the charging and discharging of said capacitor whereby during discharging of said capacitor said rectifiers and conductors provide a unidirectional current path in shunt with said capacitor.

12. In a welding system having a capacitor, an inductive welding load circuit, and means to discharge said capacitor through said load circuit; means to charge said capacitor from an alternating current source and to prevent oscillation in said load circuit upon the discharge of said capacitor comprising a transformer having its secondary adapted to be connected to said capacitor through a rectifier, said secondary being constructed for low impedance whereby said rectifier and secondary provides an effective unidirectional current path in shunt with said capacitor upon the discharge of said capacitor through said load circuit.

13. Apparatus according to claim 12 further characterized in that said transformer is constructed with high primary to secondary leakage reactance whereby the maximum charging current passed by said rectifier is limited.

14. An electric welding system comprising a polyphase source of power, an inductive welding load circuit, a capacitor, means to discharge said capacitor through said load circuit, means to charge said capacitor from said polyphase source comprising a transformer having its primaries adapted to be connected to said source and its secondaries permanently connected to said capacitor through rectifiers, the secondaries of said transformer being constructed for low impedance whereby oscillation in said welding circuit during discharge of said capacitor is avoided.

STANLEY M. HUMPHREY.

REFERENCES CITED

The following references are of record in the file of this patent:

UNITED STATES PATENTS

| Number | Name | Date |
|---|---|---|
| 1,980,899 | Bedford | Nov. 13, 1934 |
| 2,078,792 | Fitzgerald | Apr. 27, 1937 |
| 2,235,385 | Rava | Mar. 18, 1941 |
| Re. 21,369 | Stoddard et al. | Feb. 20, 1940 |
| 1,163,346 | Thomson | Jan. 18, 1916 |
| 1,928,848 | Crout | Oct. 3, 1933 |
| 2,089,213 | Labadie | Aug. 10, 1937 |
| 2,105,899 | Wright | Jan. 18, 1938 |
| 2,145,724 | Horsley | Jan. 31, 1939 |
| 2,175,841 | Kafka et al. | Oct. 10, 1939 |
| 2,179,105 | Sidney | Nov. 7, 1939 |
| 1,267,481 | Von Henke | May 28, 1918 |
| 1,373,054 | Chubb | Mar. 29, 1921 |
| 2,184,627 | Watson | Dec. 26, 1939 |

FOREIGN PATENTS

| Number | Country | Date |
|---|---|---|
| 792,921 | France | Nov. 7, 1935 |
| 474,553 | Great Britain | Nov. 3, 1937 |